United States Patent [19]

Weber et al.

[11] Patent Number: 4,622,694
[45] Date of Patent: Nov. 11, 1986

[54] TRANSMISSION SYSTEM FOR TV SIGNALS ON RADIO LINKS

[75] Inventors: Herbert Weber; Hans-Peter Lier, both of Backnang, Fed. Rep. of Germany

[73] Assignee: ANT Nachrichtentechnik GmbH, Backnang, Fed. Rep. of Germany

[21] Appl. No.: 641,259

[22] Filed: Aug. 16, 1984

[30] Foreign Application Priority Data

Aug. 20, 1983 [DE] Fed. Rep. of Germany ....... 3330163

[51] Int. Cl.$^4$ ............................................. H04B 1/68
[52] U.S. Cl. .................................... 455/47; 455/109; 332/45
[58] Field of Search ............................ 455/47, 109, 46; 332/44, 45; 358/186

[56] References Cited

U.S. PATENT DOCUMENTS 3,675,131  7/1972  Pickholtz .
3,921,073  11/1975  Pexa ....................................... 455/47
4,183,054  1/1980  Patisaul et al. ......................... 455/47

FOREIGN PATENT DOCUMENTS 956690   1/1957   Fed. Rep. of Germany .
1160000  12/1963  Fed. Rep. of Germany .
2017199  4/1971   Fed. Rep. of Germany .

OTHER PUBLICATIONS

B. Fisk and C. L. Spencer, a publication from the Proceedings of the IRE entitled "Synthesizer Stabilized Single-Sideband Systems", Dec., 1956, pp. 1680–1685.
Anzac catalogue, 1982, p. 96.
W. von Guttenberg and E. Kugler, "Modulation of Television Signals for Joint Transmission of Telephone and Television over Cables", 1964, pp. 325–331.
John P. Costas, "Synchronous Communications", Proc. IRE 44 1956, pp. 1713–1718.

Primary Examiner—Jin F. Ng
Assistant Examiner—Andrew J. Telesz, Jr.
Attorney, Agent, or Firm—Spencer & Frank

[57] ABSTRACT

A system for transmitting television signals on a radio link. The system includes a transmitter having a modulator for modulating a carrier signal to produce a vestigial sideband amplitude modulated signal for transmission. The modulator includes a first converter for converting the frequency of video signals to an intermediate frequency and a second converter for converting the intermediate frequency of the video signals to a radio frequency. The system further includes a receiver having a demodulator for demodulating a received vestigial sideband amplitude modulated signal. The modulator includes a Nyquist filter connected between the first and second converters, and the demodulator includes a filter having a rectangular characteristic for processing the signal to be demodulated.

1 Claim, 11 Drawing Figures

TRANSMISSION SYSTEM FOR TV SIGNALS ON RADIO LINKS

BACKGROUND OF THE INVENTION

The present invention relates to a transmission system for television signals operating on radio links according to the vestigial sideband amplitude modulation system.

In a television transmission system, it is conventional to use a Nyquist filter in the television receiver ahead of the demodulator in order to satisfy pertinent regulatory standards. Radio links, however, are not bound by the same regulatory standards as television, which makes it possible to consider other options and developments when transmitting TV signals on a radio link.

SUMMARY OF THE INVENTION

It is an object of the present invention to provide a transmission system of the above-mentioned type, wherein the transmitting power is reduced so that the difference between the saturation power of the transmitting amplifier and the channel power is increased, thus reducing transmission distortions.

The above and other objects are accomplished according to the invention by the provision of a system for transmitting television signals on a radio link. The system includes a transmitter having a modulating means for modulating a carrier signal to produce a vestigial sideband amplitude modulated signal for transmission. The modulating means includes a first conversion means for converting the frequency of video signals to an intermediate frequency and a second conversion means for converting the intermediate frequency of the video signals to a radio frequency. The system further includes a receiver having a demodulating means for demodulating a received vestigial sideband amplitude modulated signal. Additionally, according to the invention the modulating means includes a Nyquist filter connected between the first and second conversion means, and the demodulating means includes a filter having a rectangular characteristic for processing the signal to be demodulated.

DESCRIPTION OF THE PREFERRED EMBODIMENTS

In the development of devices for the transmission of single sideband AM television signals via radio links, it is desirable to develop a modulation and demodulation scheme which makes it possible to operate with the lowest possible transmitting power which, for single sideband modulation, requires the greatest possible carrier suppression. In the ideal case, the required transmitting power is determined only on the basis of the sideband power. For this purpose, two embodiments according to the invention are disclosed which permit operation with partial or complete carrier suppression. These embodiments employ synchronous demodulators which are either able to regenerate the existing, suppressed carrier or to recover the carrier by way of a correlation of the sideband information.

A modulator according to the invention operates according to the following principle. In view of the baseband region for the video signal, it is advisable to generate the single sideband signal by means of a filtering technique. Due to the extremely low frequency signal content, the single sideband filter of the modulator is preferably designed as a filter which has a Nyquist flank so that selection requirements can be kept within limits. These selection requirements are described later in connection with FIG. 2.

Figure 1:
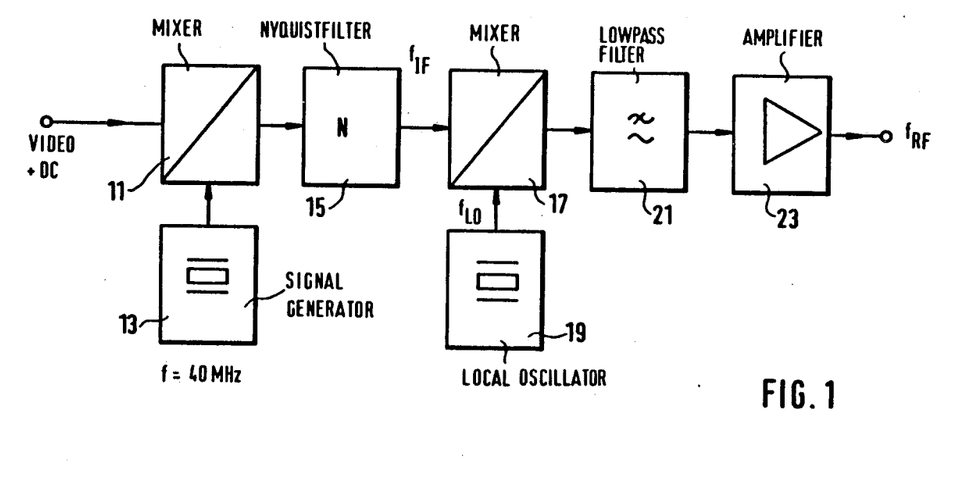
FIG. 1 is a block circuit diagram of a single channel baseband modulator according to the present invention.

FIG. 1 shows a block circuit diagram of a modulator according to the invention. A video signal having a direct voltage bias is fed to a high level double-balanced mixer 11 which is, preferably a mixer with a high intercept point, e.g. Anzac MD-125, Anzac catalogue 1982, page 96, connected to a signal generator 13 which produces a signal having a frequency of 40 MHz. Mixer 11 performs a double sideband amplitude modulation at $f_{IF}=40$ MHz, with a carrier level which can be set by way of the direct voltage magnitude of the baseband signal. The output of mixer 11 is connected to a Nyquist filter 15. Such a Nyquist filter is described in "Pfitzenmaier, Tabellenbuch Tiefpässe (table book Low-Passes), Siemens AG, Normtiefpass (standardized low-passes) T15/20 dB. Various RF channels are recovered subsequent to the Nyquist filtering by lower sideband (inverse position) conversion. The output of Nyquist filter 15 is combined with a signal from local oscillator 19 in a state of art mixer 17 to produce a signal of radio frequency: $f_{RF}=f_{LO}-f_{IF}$. The output of mixer 17 is filtered by a low-pass filter 21 to suppress the upper-sideband ($f=f_{LO}+f_{RF}$) and thereafter amplified by an amplifier 23.

The frequency range of the local oscillator 19 is as follows:

| channel No. | $f_{RF}$ | $f_{LO}$ |
| --- | --- | --- |
| 1 | 53 MHz | 93 MHz |
| 2 | 63 MHz | 103 MHz |
| . | . | . |
| . | . | . |
| . | . | . |
| N | $f_{RF}$ | $f_{LO}-f_{IF}$ |

The extent of the suppression of the carrier signal depends on the DC component of the signal fed to mixer 11. If the DC component is zero, double balanced mixer 11 suppresses the carrier completely. The modulator of FIG. 1 has several advantages. The same Nyquist filter is used for all channels. Conversion to VHF and UHF ranges is easily possible by appropriately changing the frequency of the local oscillator 19. Further, a lowpass filter which passes the lower sideband can be used as the Nyquist filter, so that after the lower sideband mixing process, the sideband is kept in the regular position.

Figure 2:
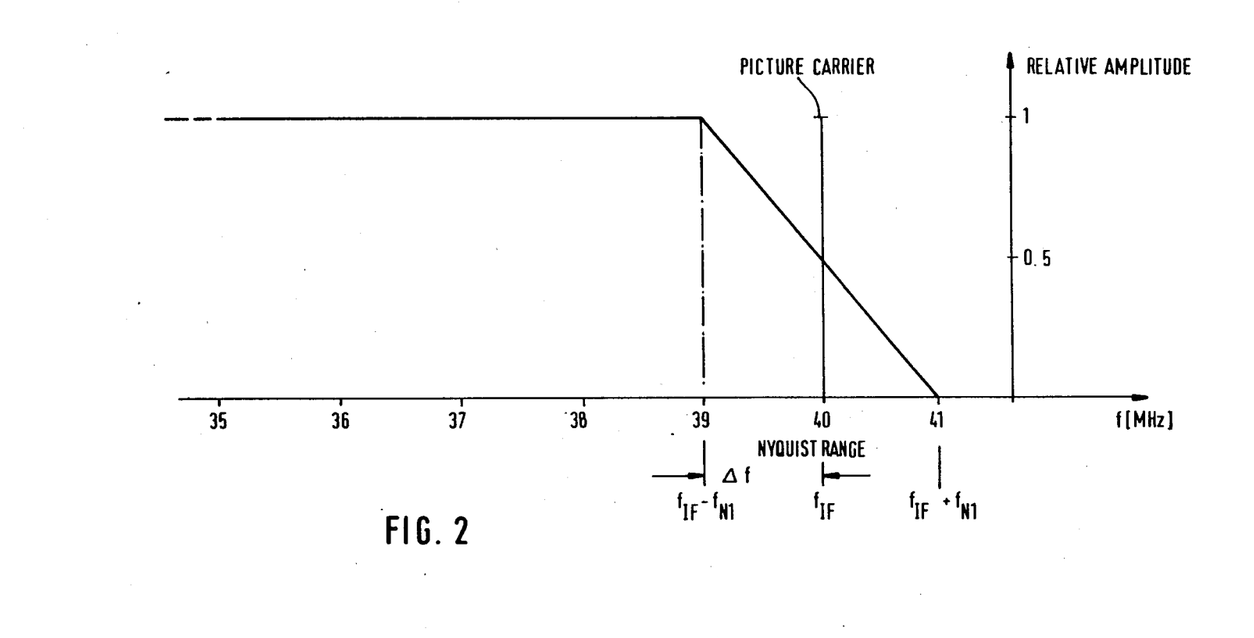
FIG. 2 is a diagram of the frequency response of the baseband modulator of FIG. 1.

Preferably, the Nyquist flank is designed as shown in FIG. 2, according to which the Nyquist range extends at a distance of $\Delta f = \pm 1$ Mhz around the carrier frequency. The Nyquist flank has a steepness of 20 dB in a frequency range of 1.5 MHz. This permits sufficient sideband suppression with reasonable expenditures for the Nyquist filter.

Synchronous demodulation requires carrier regeneration which receives its information either from the carrier itself or, if the carrier is suppressed from a correlation of the sidebands within the Nyquist range. As discussed below, this problem is solved by two demodulator embodiments according to the invention which are based on the special modulator with Nyquist filters in the transmitter as described in connection with FIGS. 1 and 2.

Figure 3:
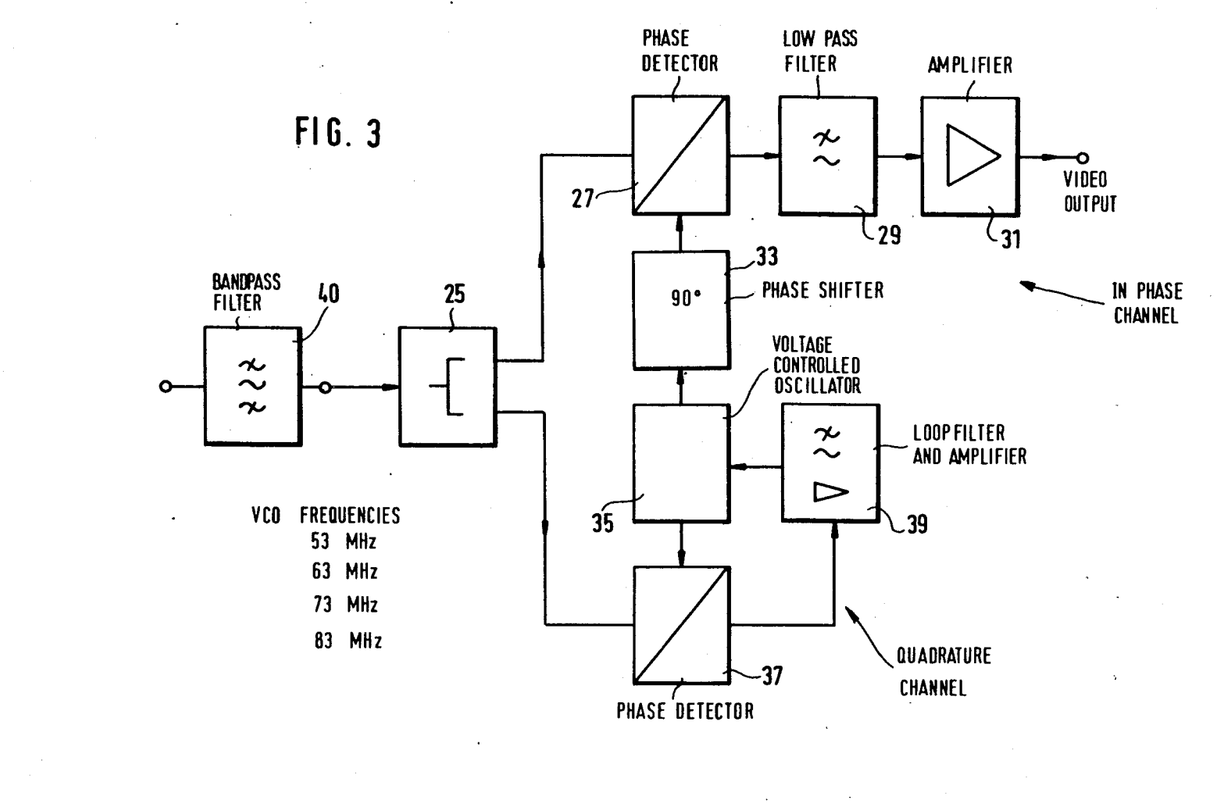
FIG. 3 is a block circuit diagram of a demodulator constructed according to the invention.

FIG. 3 shows a block circuit diagram of demodulator suitable for the synchronous demodulation of a double sideband AM signal with a carrier component.

Each of the blocks in FIG. 3 is conventional.

Figure 4:
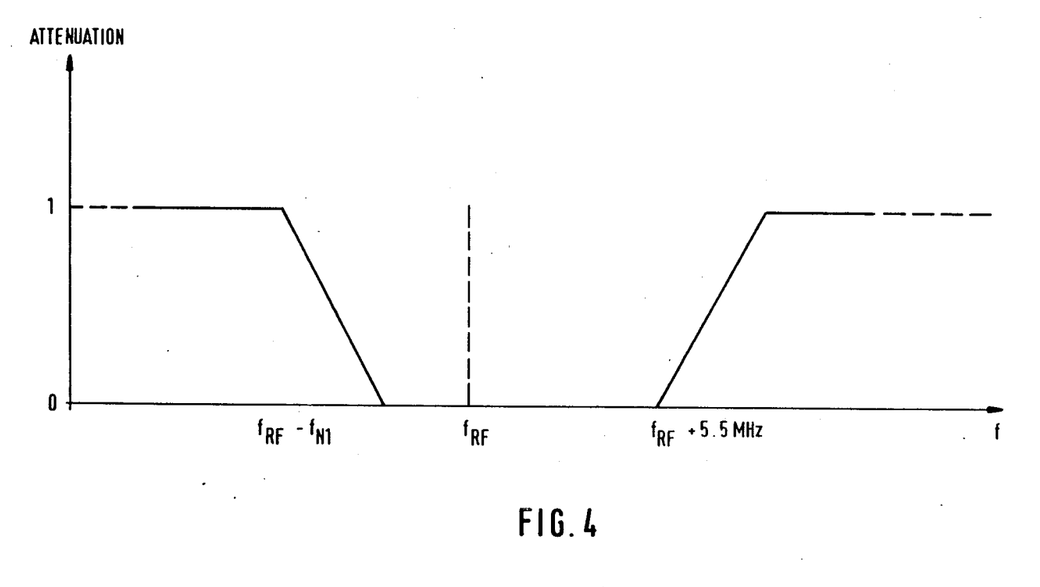
FIG. 4 is a diagramm showing the frequency response of the band-pass at the receiver's input.

The received signal is filtered at the receiver's input by a band-pass filter 40 having rectangular characteristics and split in a power divider 25. A Phase Locked Loop consisting of a voltage controlled oscillator (VCO) 35, a phase detector 37, and a loop filter with amplifier 39 is used for the carrier regeneration. Because of the phase relationships the phase locked loop (PLL) is called the quadrature channel. The output signal of the VCO 35 is phase-shifted by 90° in phase-shifter 33 and fed to the phase-detector 27. The phase-detector 27, the low pass-filter 29, and the amplifier 31 are forming the in-phase-channel, which takes care of the demodulation. The characteristics of band-pass filter 40 are shown in FIG. 4. The band-width of band-pass filter 40 is in the frequency range of $f_{RF} - f_{N1}$ and $f_{RF} + 5.5$ MHz. At the cut-off points $f_{RF} - f_{N1}$ and $f_{RF} + 5.5$ MHz the attenuation is rising very sharp from 1 to 0, giving the band-pass filter 40 nearly rectangular characteristics. In FIG. 4 this rectangular characteristics is shown more trapezoidal. The state of art Nyquist filter in television receivers has therefore to be in replaced by band-pass filter 40.

Since the amplitude of the demodulated baseband signal is, for product demodulation, proportional to the cosine of the phase difference between the reference carrier and regenerated carrier, and the carrier is regenerated in the phase control loop with an inherent phase shift of 90°, an in-phase and a quadrature channel is provided in the demodulator. The quadranture channel here takes care of the carrier regeneration; the in-phase channel takes care of the demodulation. The dynamic properties of the phase control loop are determined by the characteristics of the voltage controlled oscillator (VCO) 35, the phase detector 37, the Loop filter 39 and the signal level at the input end of band pass filter 40. The present circuit correctly demodulates double sideband AM signals with carrier up to a degree of 100% modulation (carrier sideband spacing 6 dB with monochromatic modulation). The demodulator arrangement of FIG. 3 is also able to correctly demodulate the Nyquist filtered double sideband signal with carrier. Since one sideband is suppressed and the carrier amplitude is reduced by one half with accurate tuning, the power reduction for harmonic modulation is 33.3% corresponding to −4.7 dB with reference to the double sideband signal and with a degree of modulation which is 100%. If the video signal is free from a DC component and a balanced mixer is used, the suppression of the carrier will be complete.

Figure 5A:
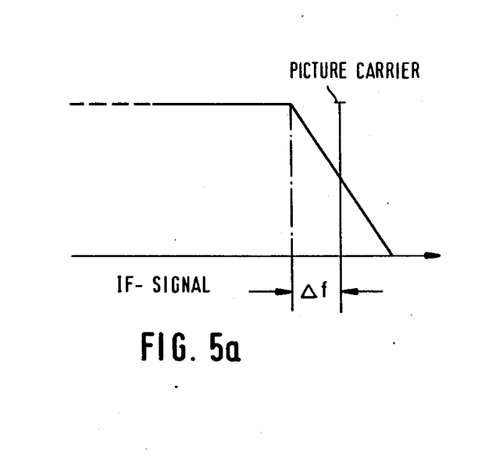
FIGS. 5a to 5c are diagrams showing the frequency response of the demodulator according to FIG. 3.
Figure 5B:
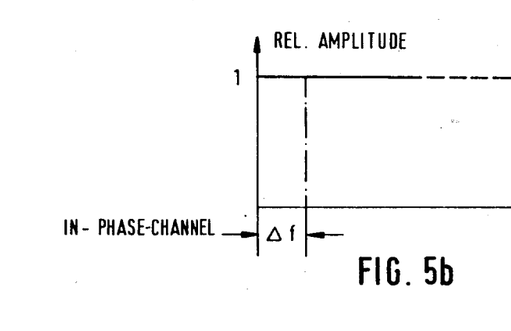
Figure 5C:
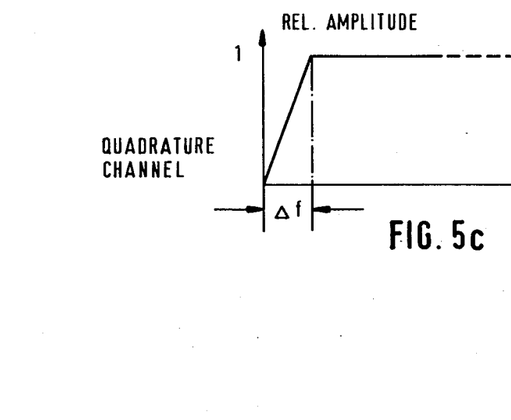

However, the most important result of the above-described modulation and demodulation method is that the pre-emphasis effected by the Nyquist filter in conjunction with quadrature demodulation in the case of a single sideband results in better demodulation characteristics than with conventional single sideband modulation with a hybrid single sideband filter and a synchronous demodulator without quadrature channel. It has been found that with a symmetrically extending Nyquist flank the Nyquist pre-emphasis of the video IF signal (FIG. 5a) is cancelled out in the in-phase channel and a constant amplitude response (FIG. 5b) results. In the quadrature channel (FIG. 5c), however, the baseband amplitude rises in linear slope with the frequency. That means, that low frequency signal components are unable to reach the modulation input of the VCO which is intended to regenerate only the carrier. Compared to conventional single sideband synchronous demodulators, the undesirable frequency modulation of the VCO which may lead to considerable distortion is therefore avoided. The influence of the improved demodulation characteristics on the power reduction for monochromatic modulation and for modulation with a video signal are considerable.

Synchronous Demodulation Without Carrier Component

Figure 6:
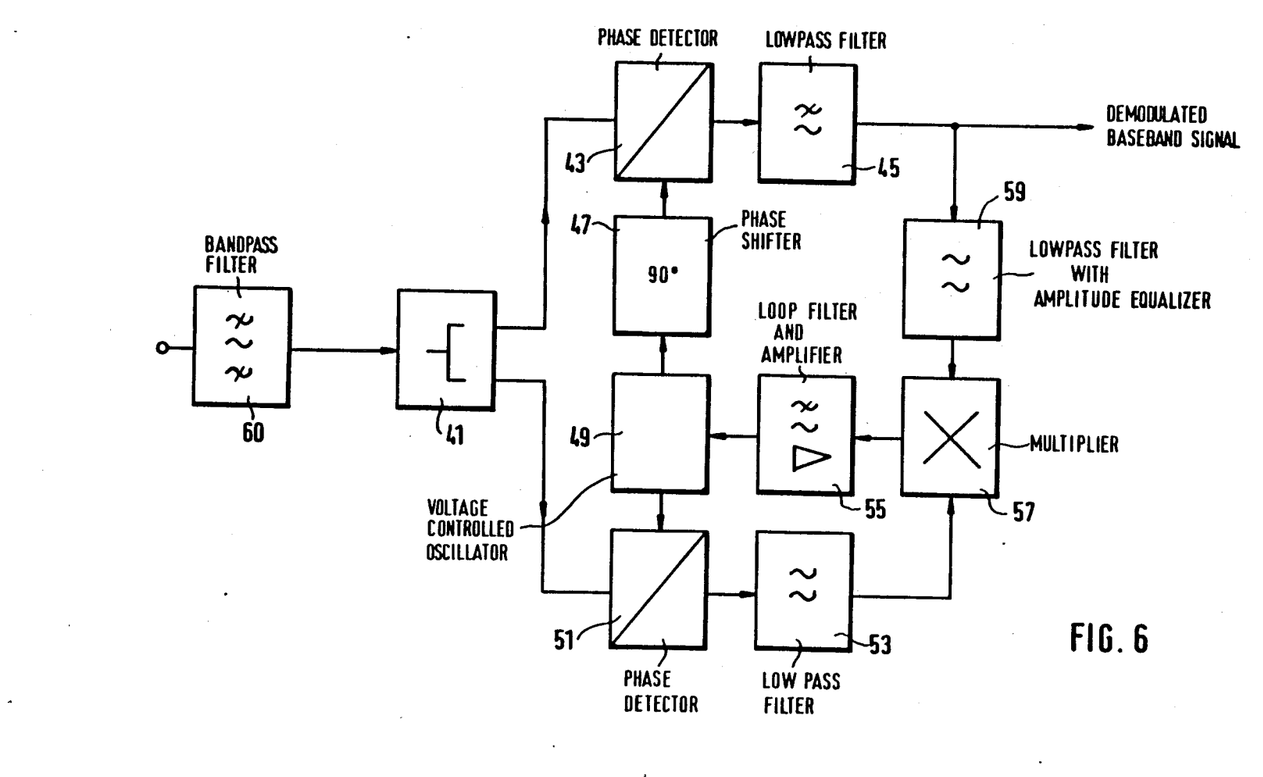
FIG. 6 is a block circuit diagram of a Costas loop receiver according to the invention for reception of a vestigial sideband signal with completely suppressed carrier.

For monochromatic modulation, the demodulation circuit of FIG. 3 can be used in the double sideband range up to modulation degrees of 100%. If the carrier is obtained from the modulated IF signal, the envelope curve will exhibit zero passages at modulation degrees of more than 100% and between these zero passages the carrier phase is shifted by 180°. Regeneration of the carrier with a constant phase is then no longer possible. For cable television systems, the publication by W. von Guttenberg and E. Kügler, entitled: "Modulation von Fernsehsignalen für gemeinsame Übertragung von Fernsprechen und Fernsehen auf Kabeln" [Modulation of Television Signals for Joint Transmission of Telephone and Television Over Cables], NTZ (1964), pages 325 et seq., discloses a regeneration concept that is based on the special time curve of the video signal. However, the method is not suitable for the transmission of test signals without average values. There further exists the possibility of transmitting the carrier phase information by way of pilot frequencies (as in, for example, VHF stereo radio), a possibility which could also be used in the present case due to the pilots that are available in any case. In addition, there also exists the possibility of recovering the carrier in double sideband signals with suppressed carrier and any desired baseband information by way of the correlation existing in the sidebands. Such a circuit arrangement is distinguished by a particularly simple structure, as shown in FIG. 6. A circuit of this type was originally proposed by J. P. Costas in "Synchronous Communication", Proc. IRE 44 (1956) pages 1713–1718. The further embodiment of a receiver shown in FIG. 6 is based on the Costas loop circuit. The received signal is filtered at the receiver's input by a band-pass filter 60 and split in a power divider 41. Band-pass filter 60 has the same rectangular characteristics as band-pass filter 40. The Costas loop comprises a voltage controlled oscillator 49, a phase shifter 47, two phase detectors 43 and 51, a low pass filter with amplitude equalizer 59, low pass filters 45 and 53, a loop filter and amplifier 55, and a multiplier 57. The output signal of voltage controlled oscillator 49 is fed to phase detector 51 directly and to phase detector 43 via phase shifter 47. Phase detectors 43 and 51 also receive the split signal of power divider 41. The output signals of phase detectors 43 and 51 are filtered by lowpass filters 45 and 53 and then fed to multiplier 57, the output signal of lowpass filter 53 directly and the output signal of lowpass filter 45 via the lowpass filter with amplitude equalizer 59. The output signal of lowpass filter 45 represents the demodulated baseband signal. The output of multiplier 57 is fed via loop filter and amplifier 55 to an input of voltage controlled oscillator 49. All block components shown in FIG. 6 are well known. Multiplier 57 constitutes a correlator which operates in the double sideband range of the Nyquist filtered signal and whose output signal is fed to the loop filter and amplifier 55. For optimum operation, the in-phase and quadrature channel must each have the same information contents. Since this is not provided by the Nyquist filtering, the deviation from the ideal double sideband behavior was calculated and it was demonstrated that the Costas loop remains operational even with pre-emphasis. The embodiments of FIGS. 3 and 6 both remain operational with pre-amphasis.

Use of pre-emphasis and de-emphasis

In contradistinction to modulation and demodulation methods employing angle modulation, in AM modulation methods, and particularly in single sideband modulation methods with white noise spectra, it is not possible to improve the signal to noise ratio at the output of the demodulator by pre-emphasis and de-emphasis. If, however, less emphasis is placed on the signal to noise ratio, it is possible, particularly for the transmission of television signals, to utilize pre-emphasis in order to reduce power. Pre-emphasis means are connected so that the signal to noise ratio in the range of the chrominance subcarrier corresponds to the signal to noise ratio during the transmission over FM radio links.

For modulation with video test pictures, the characteristics of the video signal cause a large percentage of the transmission power to be concentrated in the vicinity of the carrier. If pre-emphasis is used, this percentage can be reduced. This makes it possible to further reduce the transmission power.

Figure 7:
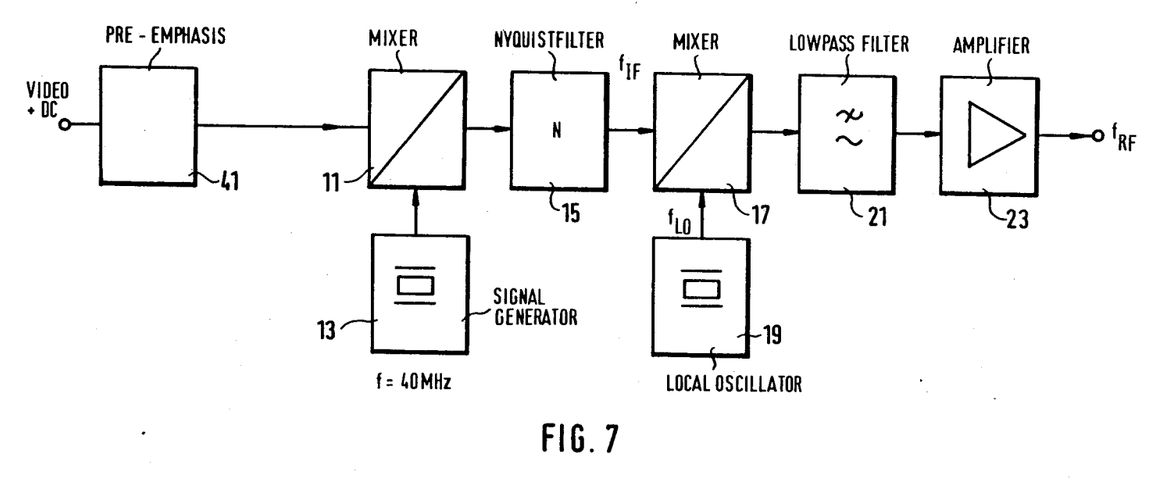
FIG. 7 is a block circuit according to FIG. 1 with pre-emphasis.
Figure 8:
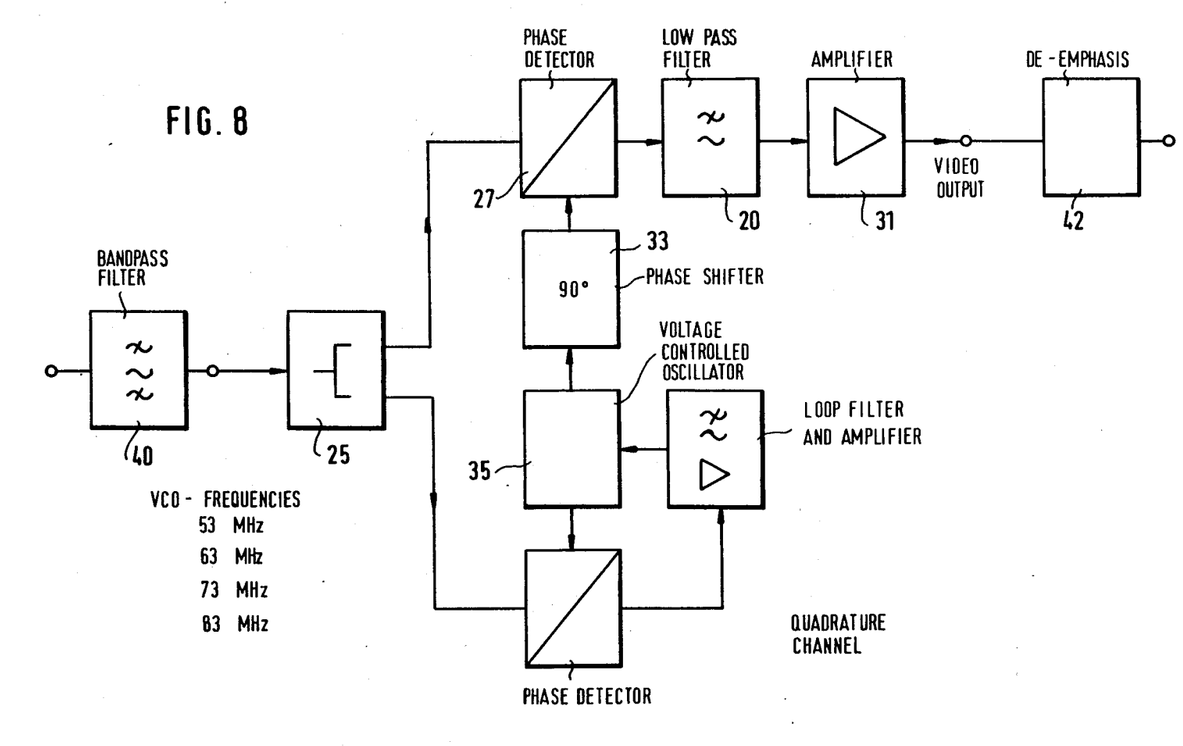
FIG. 8 is a block circuit according to FIG. 3 with de-emphasis.

FIG. 7 shows the same block diagramm as in FIG. 1 with the only exception that the video signal is fed to mixer 11 via a pre-emphasis network 41. Pre-emphasis network 41 has the effect that power to be concentrated in the vicinity of the carrier is reduced. Frequency response of pre-emphasis network 41 is discussed later in connection with FIG. 9. Realization of such a network is well known. FIG. 8 shows the same block diagramm as in FIG. 3 with the only exception that the video output of amplifier 31 is fed to a de-emphasis network 42. This de-emphasis network 42 has inverse characteristics to the pre-emphasis network 41 in FIG. 7. De-emphasis network 42 can also be connected to the demodulated baseband signal output of FIG. 6 if a pre-emphasis network is used at the transmitter side, shown in FIG. 7.

Figure 9:
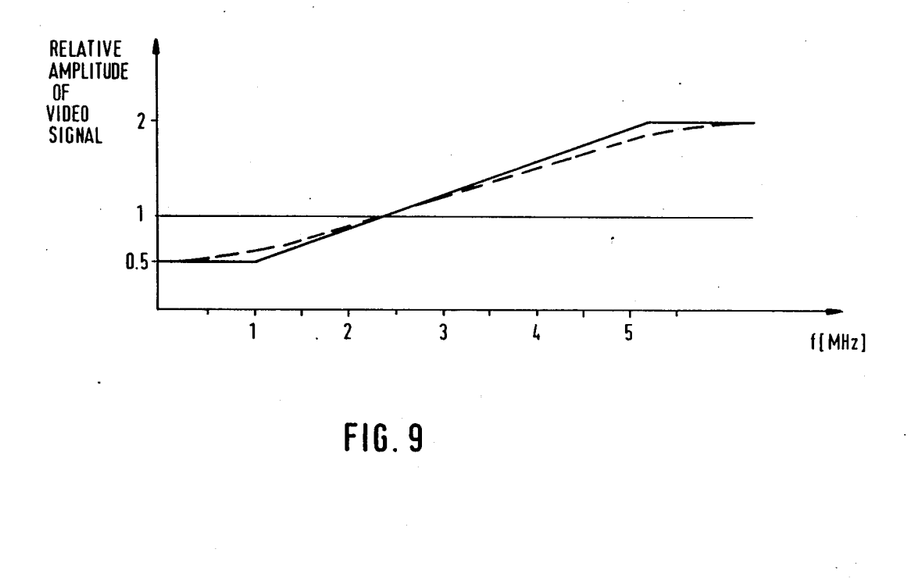
FIG. 9 is a diagram showing the frequency response of pre-emphasis network.

In FIG. 9 the pre-emphasis characteristic is shown. The video signal with a frequency range up to 5.5 MHz is reduced to half its amplitude at lower frequencies and amplified by a factor of two at higher frequencies. The dashed line is the frequency response of a realized circuitry and uninterrupted line is giving the frequency limits.

It will be understood that the above description of the present invention is susceptible to various modifications, changes and adaptations, and the same are intended to be comprehended within the meaning and range of equivalents of the appended claims.

What is claimed is:

1. In a system for transmitting television signals on a radio link, the system including a transmitter having a modulating means for modulating a carrier signal to produce a vestigial sideband amplitude modulated signal for transmission, and modulating means including a first conversion means for converting the frequency of video signals to an intermediate frequency and a second conversion means for converting the intermediate frequency of the video signals to a radio frequency, the system further including a receiver having a demodulating means for demodulating a received vestigial sideband amplitude modulated signal, the improvement wherein said modulating means includes a Nyquist filter connected between said first and second conversion means, and said demodulating means includes a filter having a bandpass characteristic for processing the signal to be demodulated and wherein the television signals are free of a DC component, said transmitter includes means for completely suppressing the carrier signal prior to transmission, so that only single sideband modulated signals are transmitted which have an amplitude versus frequency characteristic which defines a Nyquist flank in a frequency range centered on the frequency of the carrier signal, said means comprises a double balanced mixer, and said receiver includes means for recovering the carrier by correlation of sideband information in the frequency region of the Nyquist flank.

* * * * *